(12) United States Patent
Kaufmann

(10) Patent No.: US 11,637,360 B2
(45) Date of Patent: Apr. 25, 2023

(54) COMPACT DUAL-BAND GNSS ANTENNA

(71) Applicant: u-blox AG, Thalwil (CH)

(72) Inventor: Thomas Kaufmann, Zurich (CH)

(73) Assignee: u-blox AG, Thalwil (CH)

( * ) Notice: Subject to any disclaimer, the term of this patent is extended or adjusted under 35 U.S.C. 154(b) by 0 days.

(21) Appl. No.: 16/933,906

(22) Filed: Jul. 20, 2020

(65) Prior Publication Data

US 2022/0021104 A1  Jan. 20, 2022

(51) Int. Cl.
| | |
|---|---|
| *H01Q 1/38* | (2006.01) |
| *H01Q 1/24* | (2006.01) |
| *H01Q 5/35* | (2015.01) |
| *H01Q 13/10* | (2006.01) |
| *H01Q 13/18* | (2006.01) |

(52) U.S. Cl.
CPC .............. *H01Q 1/241* (2013.01); *H01Q 5/35* (2015.01); *H01Q 13/106* (2013.01); *H01Q 13/18* (2013.01)

(58) Field of Classification Search
CPC .......... H01Q 1/241; H01Q 13/18; H01Q 5/35; H01Q 13/106
See application file for complete search history.

(56) References Cited

U.S. PATENT DOCUMENTS

| | | |
|---|---|---|
| 2005/0055161 A1 | 3/2005 | Kalis et al. |
| 2006/0273961 A1* | 12/2006 | Duzdar ................ H01Q 9/0428 343/700 MS |
| 2007/0182626 A1 | 8/2007 | Samavati et al. |
| 2009/0102723 A1 | 4/2009 | Mateychuk et al. |
| 2012/0319922 A1* | 12/2012 | Fuchs ................... H01Q 1/243 343/872 |
| 2015/0071137 A1* | 3/2015 | Thiam .................. H04B 7/0413 370/297 |
| 2016/0211580 A1 | 7/2016 | Hsu |

FOREIGN PATENT DOCUMENTS

| | | |
|---|---|---|
| CN | 111146585 A | 5/2020 |
| EP | 3595086 A1 | 1/2020 |
| JP | 2018207346 A * | 12/2018 |

OTHER PUBLICATIONS

Kim, "Design and Implementation of Dual-band Circular Polarization Square Patch Antenna for GPS and DMB", IEEE 2006, pp. 2653-2656 (Year: 2006).*

Lee, "Analysis and Design of a Circular-Polarized Nearlysquare-Patch Antenna Using a Cavity Model", Microwave and Optical Technology Letters / vol. 46, No. 4, Aug. 20, 2005, pp. 406-410 (Year: 2005).*

(Continued)

*Primary Examiner* — Dieu Hien T Duong
(74) *Attorney, Agent, or Firm* — Finnegan, Henderson, Farabow, Garrett & Dunner LLP

(57) ABSTRACT

An antenna includes a substrate layer having a first surface and an opposite second surface, the second surface having a metallization layer; a conductive layer disposed on the first surface of the substrate layer; a slot formed in the conductive layer, the slot including a first part and a second part that are symmetric to each other about a diagonal of the conductive layer; and at least one feed point on the conductive layer and spaced from the slot by a predetermined distance.

19 Claims, 13 Drawing Sheets

(56) References Cited

OTHER PUBLICATIONS

S. Tripathi, P.K. Singhal, "A Compact Wideband Circularly Polarized Patch Antenna with L-Slot and Defected Ground", *International Journal of Computer & Communication Engineering Research (IJCCER)*, vol. 3, Issue 4, pp. 54-58, Jul. 2015.
O.P. Falade, M.U. Rehman, Y. Gao, X. Chen and C.G. Parini, "Single Feed Stacked Patch Circular Polarized Antenna for Triple Band GPS Receivers," *IEEE Transactions on Antennas and Propagation*, vol. 60, No. 10, pp. 4479-4484, Oct. 2012.
Nasimuddin, Z.N. Chen, and X. Qing, "Slotted Microstrip Antennas for Circular Polarization with Compact Size," *IEEE Antennas and Propagation Magazine*, vol. 55, No. 2, pp. 124-137, Apr. 2013.
K.L. Wong and J.Y. Sze, "Dual-Frequency Slotted Rectangular Microstrip Antenna," *Electronics Letters*, vol. 34, No. 14, pp. 1368-1370, Jul. 9, 1998.
F. Fezai, A.A. Nour, J. Sence, T. Monediere, F. Torres, R. Chantalat, S. Bila, and B. Jarry, "Low-Profile Dual-Band Circularly Polarized Microstrip Antenna for GNSS Applications," 2015 *9th European Conference on Antennas and Propagation (EuCAP)*, Lisbon, pp. 1-4, 2015.
Extended European Search Report dated Dec. 7, 2021, for corresponding European application No. 21186357.6. (11 pgs.).

\* cited by examiner

| Dimension | Name | Value | Range |
|---|---|---|---|
| $\varepsilon_r$ | Substrate dielectric constant | 37 | 15-60 |
| $l_{Substrate}$ | Substrate length | 24 mm | 15-30 mm |
| $h_{Substrate}$ | Substrate height (not shown) | 5 mm | 2-8 mm |
| $l_{patch}$ | Patch length | 19.8 mm | 14-28 mm |
| $C_{patch}$ | Patch chamfer | 0.9 mm | 0.75-5 mm |
| $d_{slot}$ | Slot position | 3.54 mm | 3-6 mm |
| $l_{slot}$ | Slot length | 13.1 mm | 8-24 mm |
| $w_{slot}$ | Slot width | 1.1 mm | 0.5-1.5 mm |
| $C_{slot}$ | Slot chamfer | 3.1 mm | 0.75-5 mm |
| $x_{feed}$ | Feed x-position | 1.1 mm | 0.5-5 mm |
| $y_{feed}$ | Feed y-position | -3.34 mm | -0.5 – -7 mm |

FIG. 5B

COMPACT DUAL-BAND GNSS ANTENNA

FIELD

The present disclosure relates generally to an antenna, and more particularly, to an antenna capable of circular polarization and dual-band operation.

BACKGROUND

A global navigation satellite system (GNSS) receiver receives a satellite signal transmitted from a GNSS satellite constellation through an antenna. A next generation GNSS receiver requires operation at two frequency bands. A microstrip patch antenna with a stacked structure and a single feed may be used for the purpose of dual-band operation.

Manufacturing of an antenna with a stacked structure requires molding two separate ceramic layers, adding metallization onto both ceramic layers, and then assembling the two antenna layers. This increases the size and cost of the antenna.

SUMMARY

According to some embodiments of the present disclosure, there is provided an antenna. The antenna includes a substrate layer having a first surface and an opposite second surface, the second surface having a metallization layer; a conductive layer disposed on the first surface of the substrate layer; a slot formed in the conductive layer, the slot including a first part and a second part that are symmetric to each other about a diagonal of the conductive layer; and at least one feed point on the conductive layer and spaced from the slot by a predetermined distance.

According to some embodiments of the present disclosure, there is also provided a device. The device includes: a housing; a printed circuit board; and an antenna attached to the printed circuit board and disposed inside the housing, wherein the antenna includes: a substrate layer having a first surface and an opposite second surface, the second surface having a metallization layer; a conductive layer disposed on the first surface of the substrate layer; a slot formed in the conductive layer, the slot comprising a first part and a second part that are symmetric to each other about a diagonal of the conductive layer; and at least one feed point on the conductive layer and spaced from the slot by a predetermined distance.

According to some embodiments of the present disclosure, there is further provided an apparatus. The apparatus includes a patch antenna configured to provide dual resonant frequencies, including a slot formed in a conductive layer of the antenna; and a receiver configured to process signals received from the antenna and provide positioning information.

BRIEF DESCRIPTION OF FIGURES

FIG. 5B is a table providing exemplary values of the annotated dimensions, consistent with some embodiments of the present disclosure.

DETAILED DESCRIPTION

Figure 1A:
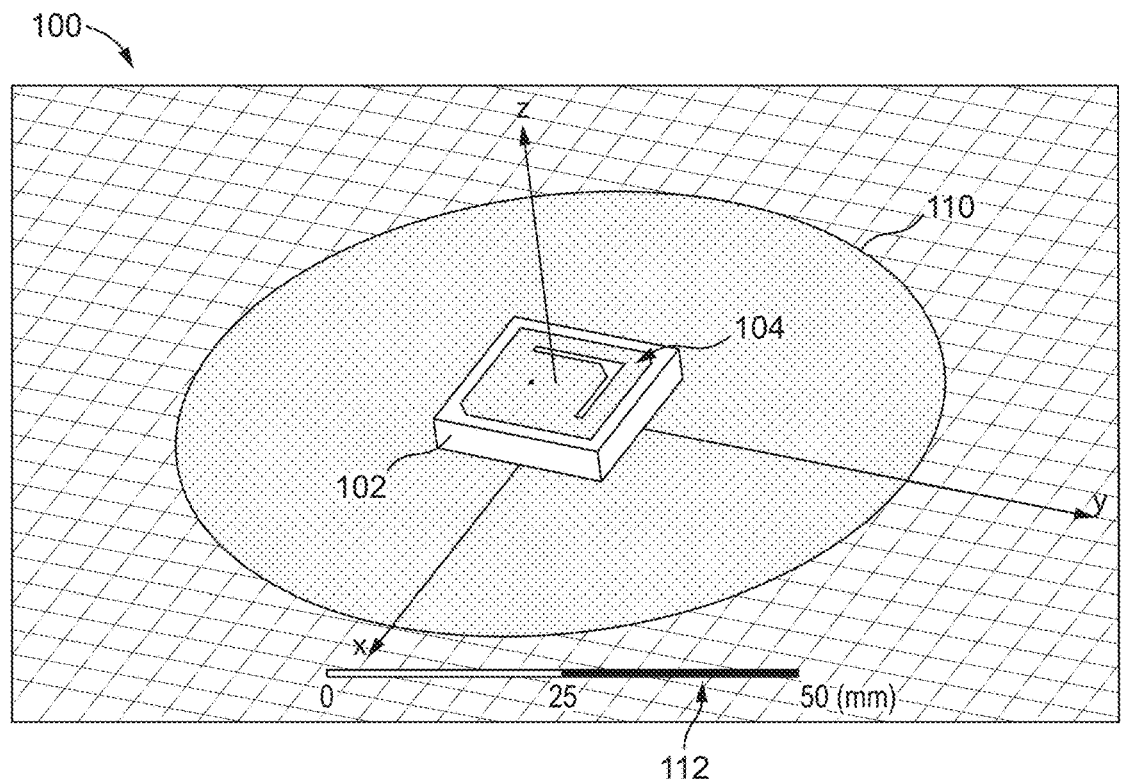
FIG. 1A is a schematic diagram illustrating a three-dimensional view of an antenna.

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the present disclosure. Instead, they are merely examples of systems, apparatuses, and methods consistent with aspects related to the present disclosure as recited in the appended claims.

A global navigation satellite system (GNSS) receiver receives a satellite signal transmitted from a GNSS satellite constellation through an antenna. A next generation GNSS receiver requires operation at two frequency bands. Thus, it is desirable to design an antenna that can be operated at the two frequency bands. For example, some L1/L5 standard precision GNSS (SPG) products (e.g., for asset tracking) need an antenna that covers an L1 frequency band (1575.4 MHz) and an L5 frequency band (1176.4 MHz). A microstrip patch antenna with a stacked structure and a single feed may be used for the purpose of dual-band operations. However, manufacturing an antenna with a stacked structure requires molding two separate ceramic layers, adding metallization onto both ceramic layers, and then assembling the two antenna layers. This increases the size and cost of the antenna. In view of the increased size and cost, the present inventors determined it would be desirable to design a compact, single-layer structure antenna covering two frequency bands with a low cost of production.

Moreover, circularly polarized antennas are desirable in GNSS receiver applications, and a right-hand circularly polarized antenna is preferred in many applications owing to its ability to mitigate errors due to multipath signals. However, a conventional microstrip patch antenna, e.g., with a patch chamfer formed at corners of a patch layer, may only provide left-hand circularly polarized antennas.

Embodiments of the present disclosure provide a compact microstrip patch antenna that can be operated in two resonant frequencies. The antenna includes a slot formed in a single patch layer and a feed point positioned off a center line of the patch layer. The slot includes two rectangular legs that are connected to each other and are symmetric about the center line of the patch layer. The patch layer includes a pair of chamfers. The slot also includes a chamfer at its corner. The antenna includes a substrate on which the patch layer is formed, and the substrate is made of a dielectric material with a moderately high dielectric constant (e.g., 30-40).

Embodiments disclosed herein have one or more technical effects. Utilizing a substrate made of a dielectric material with a moderately high dielectric constant allows for a reduced size of the antenna. Forming a slot in the patch layer provides two regions of the patch layer that can excite two resonant frequencies, thereby eliminating the need for a stacked structure, leading to a reduced size and a reduced cost. Forming chamfers at the two regions of the patch layer and adjusting the orientation of the slot allows for excitation of right-hand circular polarization, ensuring enhanced mitigation of errors due to multipath signals and accuracy of the measurements. By selecting a proper position, size, and shape of the slot and a position of the feed point, the antenna may be operated in non-dominant modes, thereby enhancing efficiency of the antenna. The form factor of the antenna allows for the antenna to fit in a standard GNSS L1 antenna housing, leading to enhanced compatibility and flexibility.

Figure 1B:
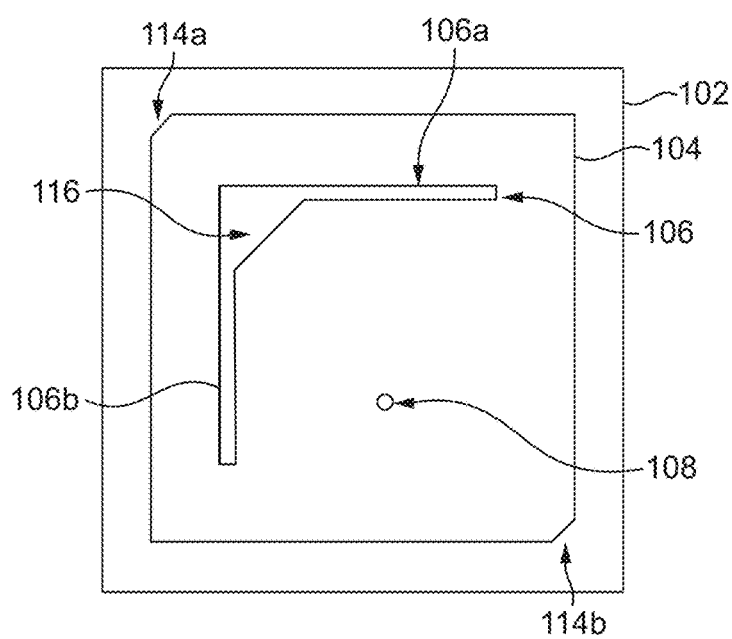
FIG. 1B is a schematic diagram illustrating a front view of the antenna, consistent with some embodiments of the present disclosure.

FIG. 1A is a schematic diagram illustrating a three-dimensional view of an antenna 100 and FIG. 1B is a schematic diagram illustrating a front view of antenna 100, consistent with some embodiments of the present disclosure. Referring to FIG. 1A and FIG. 1B, antenna 100 includes a substrate 102, a conductive layer 104 disposed on a top surface of substrate 102, a slot 106 formed in conductive layer 104, and a feed point 108. As shown in FIG. 1A, substrate 102 is mounted on a ground plane 110. In an embodiment, ground plane 110 may be a conductive plate such as a metal sheet. In an embodiment, substrate 102 may have a metallization layer on a bottom surface opposite the top surface thereof. FIG. 1A also shows a scale bar 112.

In an embodiment, substrate 102 may be made of a dielectric material with a high dielectric constant, to reduce the size of antenna 100. In another embodiment, substrate 102 may be made of a dielectric material with a moderately high dielectric constant, to improve the gain of antenna 100 while also reducing the size of the antenna. For example, a dielectric material with a dielectric constant around 37 may be used as the substrate. However, the selection of the dielectric material for substrate 102 is not so limited, any dielectric material with a dielectric constant between 15 to 60 can be used. The top or bottom surface of substrate 102 may have a square, rectangular, circular, or any other shape. The dielectric material may include ceramics, polymers, or any other materials having a suitable dielectric constant.

Conductive layer 104 may be a metal or metal alloy that forms a patch layer. For example, conductive layer 104 may be a copper layer. However, conductive layer 104 is not so limited. Any material having a suitable conductivity can be used as conductive layer 104. Conductive layer 104 may be formed by thin-film deposition or plating or any other method known in the art. In an embodiment, as shown in FIG. 1B, conductive layer 104 has a square shape. Two corners in a diagonal direction of conductive layer 104 are truncated to form a pair of patch chamfers 114a and 114b. In an embodiment, the patch chamfers 114a and 114b are formed by cutting two isosceles right triangles from the square-shaped conductive layer 104. The shape of conductive layer 104 is not limited to a square, and instead can be rectangular or any other shape. The pair of patch chamfers 114a and 114b provide excitation of two orthogonal signals which form circular polarization by a 90-degree phase shift of the signals.

Feed point 108 may be off-centered relative to the periphery of conductive layer 104. For example, feed point 108 may be spaced apart from the center of conductive layer 104 or positioned off from center lines (e.g., horizontal, vertical and/or diagonal center lines) of conductive layer 104. Signals may be fed to conductive layer 104 through a feed pin (not shown) or a coaxial cable (not shown) connected to feed point 108. The impedance of conductive layer 104 can be adjusted by adjusting the separation distance between feed point 108 and the center of conductive layer 104. In addition, the resonant frequency of conductive layer 104 can be controlled by adjusting the position of feed point 108 on conductive layer 104.

In an embodiment, slot 106 has an L shape and includes a rectangular leg 106a extending in a horizontal direction and a rectangular leg 106b extending in a vertical direction, as viewed in FIG. 1B. In an embodiment, slot 106 may be formed by etching or electropolishing a portion of conductive layer 104, or by any other method known in the art. In another embodiment, slot 106 may be formed by selectively forming conductive layer 104 at predesigned areas on substrate 102 by screen printing or by any other method known in the art. Feed point 108 may be spaced from rectangular leg 106a and rectangular leg 106b by a predetermined distance. In an embodiment, rectangular leg 106a and rectangular leg 106b may have the same length and width. Rectangular leg 106a and rectangular leg 106b are substantially perpendicular to each other and connected to each other at a corner. As used herein, "substantially perpendicular" may refer to an angle between rectangular leg 106a and rectangular leg 106b in the range of 80°-100°. Slot 106 may be positioned in such a way that rectangular leg 106a and rectangular leg 106b are symmetric to each other about a diagonal of conductive layer 104 connecting chamfers 114a and 114b. A portion of conductive layer 104 at the corner of slot 106 is truncated to form a slot chamfer 116. The portion of conductive layer 104 at the corner of slot 106 may be truncated generally in the form of an isosceles right triangle. However, the position of slot 106 is not so limited, and can be anywhere on conductive layer 104.

By forming slot 106 having chamfer 116, a corner-truncated patch area that is smaller than the area of conductive layer 104 is formed within conductive layer 104. For convenience, conductive layer 104 having chamfers 114a and 114b is referred to as the "larger patch" hereinafter. A "smaller patch" is surrounded by rectangular legs 106a, 106b, and the two sides of conductive layer 104 facing chamfer 116. The smaller patch includes two truncated corners, i.e., chamfer 116 and chamfer 114b. In an embodiment, slot 106 is placed such that the smaller patch has a square shape. In an embodiment, the position of slot 106 is adjusted such that the smaller patch has a desired area and thus desired resonant frequency. The resonant frequency of the smaller patch can also be adjusted by adjusting the position of feed point 108 on conductive layer 104.

Formation of the two patches with different sizes allows for excitation of two modes that are resonant at the two different frequencies: the smaller patch excites a higher frequency and the larger patch excites a lower frequency. The chamfers of the two patches allow for each of the two patches to obtain circular polarization. In an embodiment, a right-hand circular polarization or a left-hand circular polarization is selected by adjusting the orientation of slot 106. In an embodiment, the shape, size, and position of slot 106 are designed such that antenna 100 provides desired dual-band resonant frequencies. In an embodiment, the position of feed point 108 can be determined such that antenna 100 provides desired dual-band resonant frequencies.

By utilizing an L-shaped slot with a slot chamfer on the patch layer, a compact dual-band circularly polarized antenna is obtained at the cost and size of a standard microstrip patch antenna. For example, utilizing a substrate made of a dielectric material with a moderately high dielectric constant allows for reduced size of the antenna. Forming a slot in the patch layer provides two patch areas that can excite two different resonant frequencies, thereby eliminating the need for a stacked structure, resulting in a reduced size and cost. Forming chamfers at the two patch areas and adjusting the orientation of the slot allow for excitation of right-hand circular polarization, ensuring enhanced mitigation of errors due to multipath signals and accuracy of the measurements. Moreover, the slot may function as an inductive load, thereby further reducing the size of the antenna.

Figure 2:
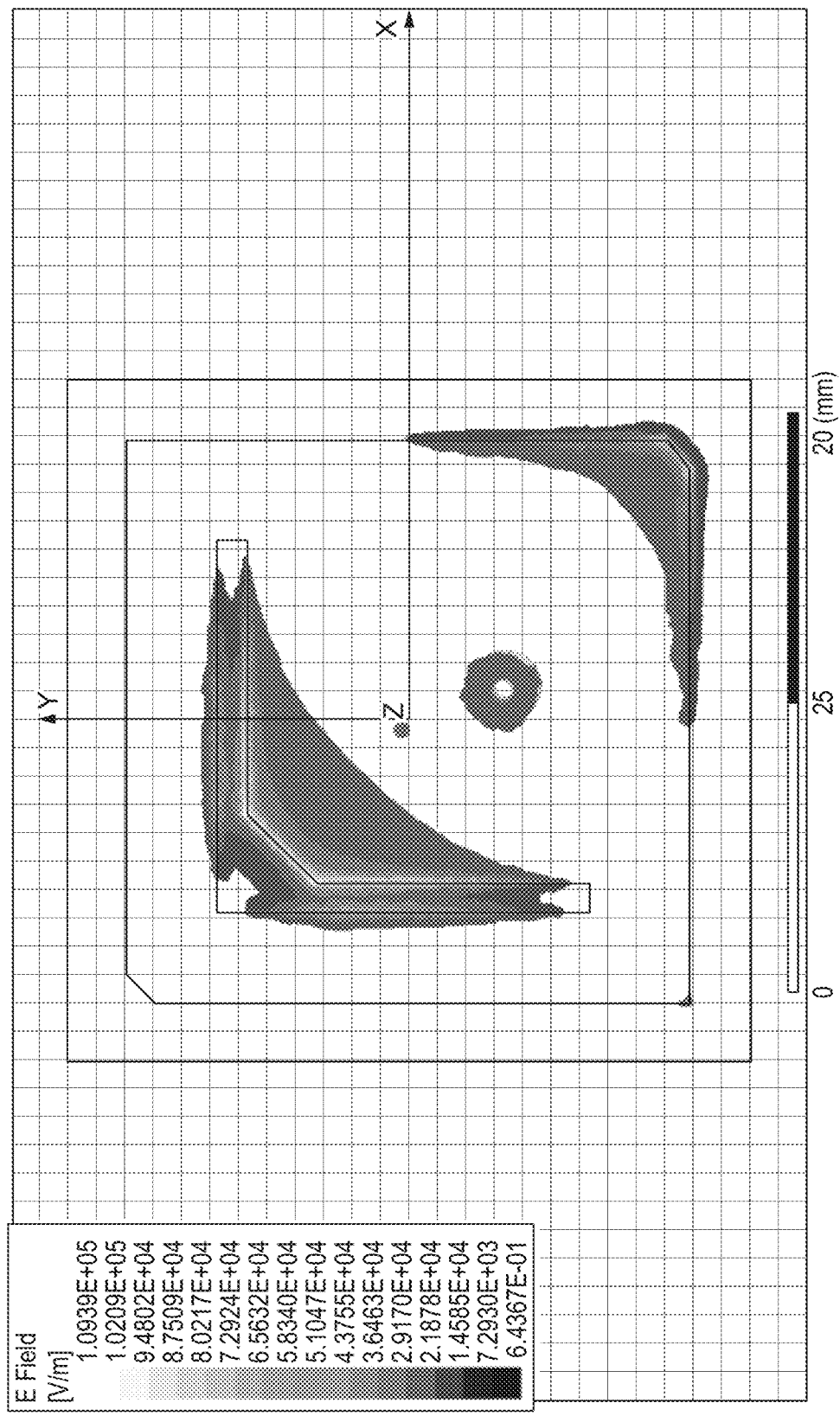
FIG. 2 is a schematic diagram illustrating a simulated instantaneous electric field formed at an excitation of an L1 frequency band at the antenna, consistent with some embodiments of the present disclosure.

FIG. 2 is a schematic diagram illustrating a simulated instantaneous electric field formed at an excitation of the L1 frequency band (1575.4 MHz) at antenna 100, consistent with some embodiments of the present disclosure. As shown in FIG. 2, for the L1 frequency band, a mode with the smaller patch area is excited.

Figure 3:
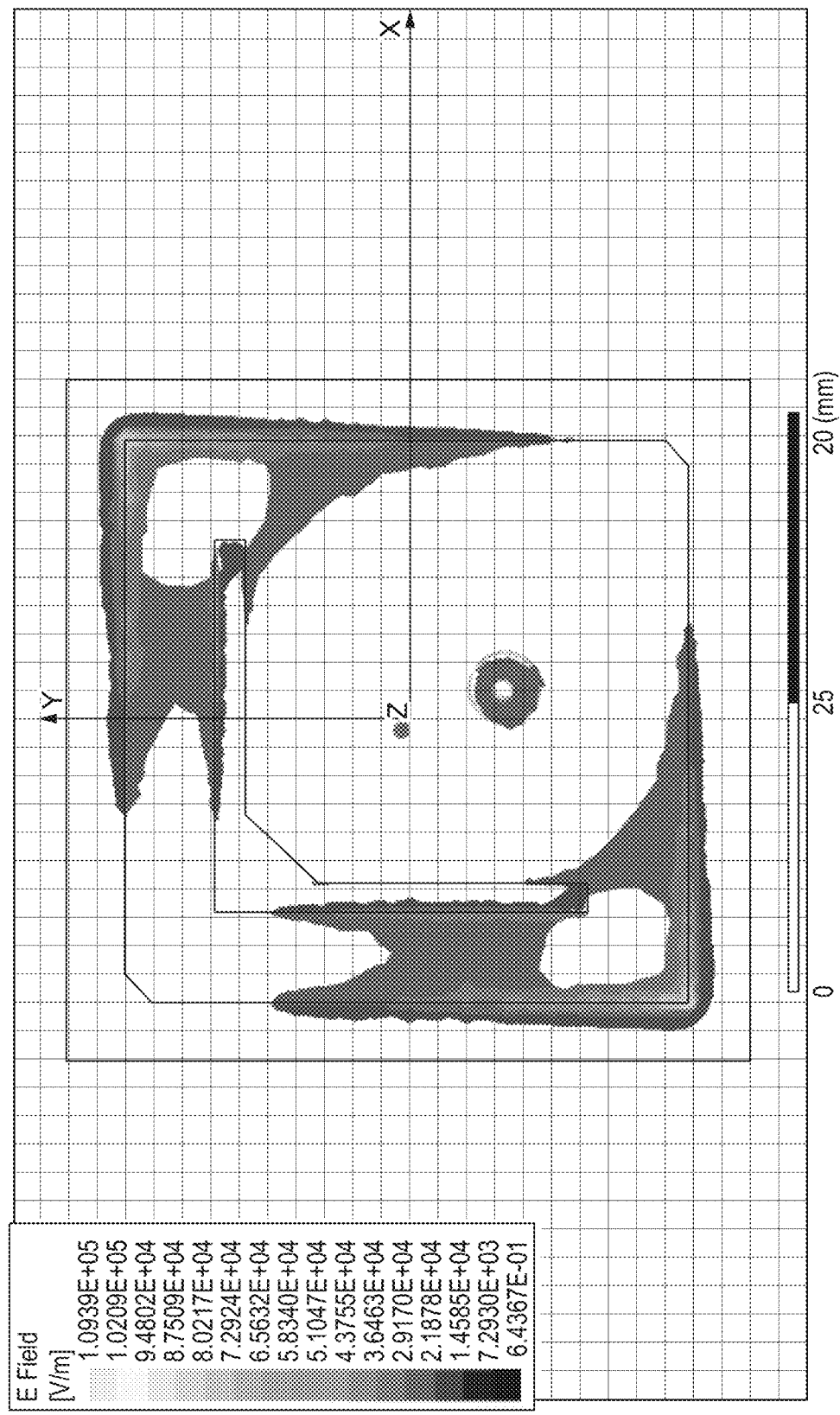
FIG. 3 is a schematic diagram illustrating a simulated instantaneous electric field formed at an excitation of an L5 frequency band at the antenna, consistent with some embodiments of the present disclosure.

FIG. 3 is a schematic diagram illustrating a simulated instantaneous electric field formed at an excitation of the L5 frequency band (1176.4 MHz) at antenna 100, consistent with some embodiments of the present disclosure. As shown in FIG. 3, for the L5 frequency band, a mode with the larger patch area is excited.

Figure 4:
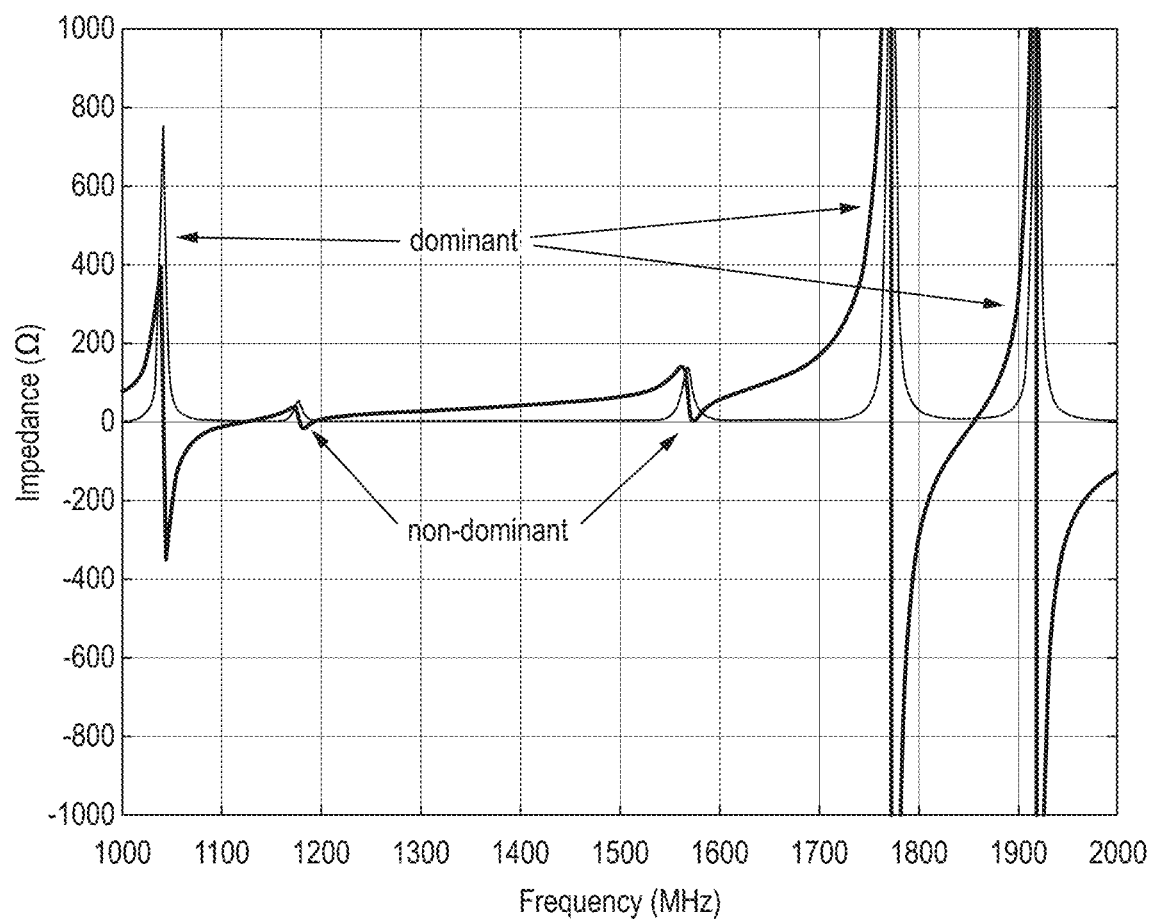
FIG. 4 is a plot illustrating an input impedance as a function of frequency in an antenna, consistent with some embodiments of the present disclosure.

FIG. 4 is a plot illustrating an input impedance as a function of frequency in antenna 100, consistent with some embodiments of the present disclosure. FIG. 4 shows three dominant modes at frequency ranges of 1000-1100 MHz, 1700-1800 MHz, and 1900-2000 MHz, respectively. FIG. 4 also shows two non-dominant modes at frequency ranges of 1100-1200 MHz and 1500-1600 MHz, respectively. As shown in FIG. 4, the magnitude of the input impedance at an antenna port is much smaller for the non-dominant modes compared to the dominant modes. The two non-dominant modes at the frequency ranges of 1100-1200 MHz and 1500-1600 MHz correspond to L5 and L1 frequencies, respectively. In an embodiment, a shape, size, and position of slot 106 and a position of feed point 108 of antenna 100 are designed so that the non-dominant modes are excited in the antenna. For example, for the excitation of the non-dominant modes, slot 106 can be placed in a position close to the center of conductive layer 104 (FIG. 1B), rather than close to the edge of conductive layer 104. In this manner, a current density between slot 106 and the edges of conductive layer 104 is reduced, leading to an enhanced efficiency of the antenna. Also, at the non-dominant modes, slot 106 functions as an inductive load, thereby further reducing the size of the antenna 100. In the non-dominant modes, the frequency ratio L1/L5 is about 1.3 and simulated efficiency is above 60%.

In another embodiment, a shape, size, and position of slot 106 and a position of feed point 108 are designed so that the dominant modes are excited. For example, slot 106 may be placed in a position close to the edges of conductive layer 104 or feed point 108 may be placed in a position close to the center of conductive layer 104.

In an embodiment, antenna 100 in FIG. 1 may be designed for use at frequencies other than the L1/L5 frequency bands. For example, the L1/L2 frequency bands or any other different combinations of frequencies may be used. In an embodiment, antenna 100 may capture L1/L2C bands of global positioning system (GPS) or E1/E5b bands of Galileo (European Union's satellite system) or B1C/B2b bands of BeiDou (Chinese satellite system). Antenna 100 may also track the L1OF/L2OF bands of GLONASS (Russian satellite system) at low carrier-to-noise density ratios of signals ($CN_0$).

Figure 5A:
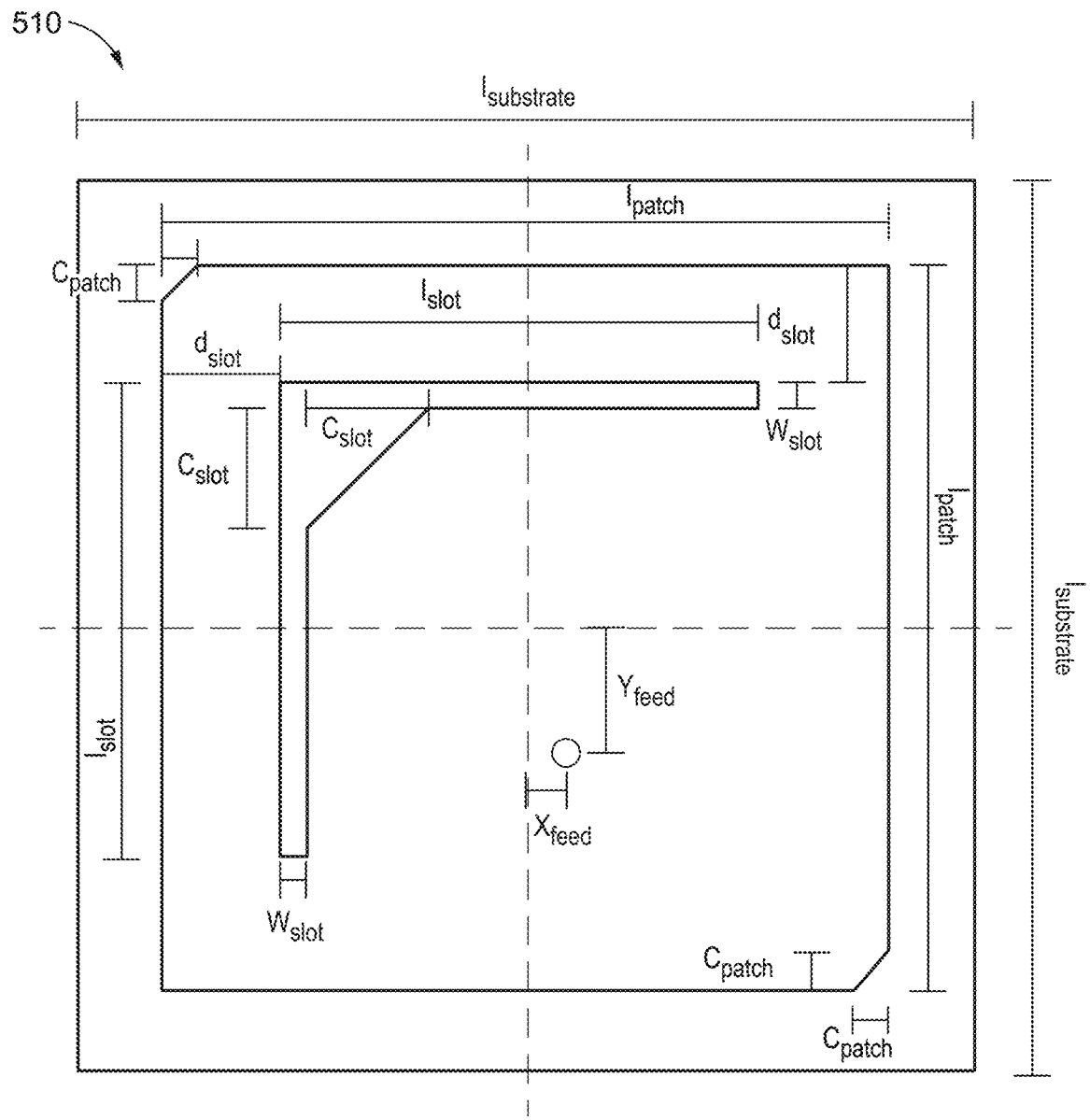
FIG. 5A is a schematic diagram illustrating a front view of an antenna with annotated dimensions.

FIG. 5A is a schematic diagram illustrating a front view of an antenna 510 with annotated dimensions, and FIG. 5B is a Table 520 listing exemplary values of the annotated dimensions, consistent with some embodiments of the present disclosure. Antenna 510 has the same structure as antenna 100 in FIG. 1B, and thus, the reference numbers for the elements of antenna 510 are the same as that of antenna 100. For brevity, the reference numbers for antenna 510 are omitted. Referring to FIG. 5A, $l_{substrate}$ denotes a length of substrate 102, $h_{substrate}$ (not shown) denotes a height of substrate 102, $l_{patch}$ denotes a length of conductive layer 104, $c_{patch}$ denotes a side length of an isosceles right triangle cut from the corners of conductive layer 104 to form patch chamfers, $d_{slot}$ denotes a separation distance between an outer edge of slot 106 and an edge of conductive layer 104 facing the outer edge of the slot, $l_{slot}$ denotes a length of a rectangular leg of slot 106 including the length of chamfer portion, $w_{slot}$ denotes a width of a rectangular leg of slot 106, $c_{slot}$ denotes a side length of isosceles right triangle cut from a corner of slot 106 to form slot chamfer 116, $x_{feed}$ denotes a x-coordinate of feed point 108 in a x-y coordinate system with the center of conductive layer 104 as the origin, and $y_{feed}$ denotes a y-coordinate of feed point 108 in the x-y coordinate system. Referring to FIG. 5B, the first column indicates the annotated dimensions of FIG. 5A, the second column indicates the definitions of the annotated dimensions, the third column indicates exemplary values of the annotated dimensions, and the last column indicates exemplary ranges of the annotated dimensions. In an exemplary embodiment, a form factor of the antenna may be 24×24×5 $mm^3$ so that the antenna fits in a standard GNSS L1 antenna housing.

In an embodiment, dual-band antenna properties are simulated using the dimensions listed in the third column of Table 520. The diameter of ground plane 110 (FIG. 1A) used in this simulation is about 10 cm and the form factor of the antenna is 24×24×5 $mm^3$. The simulation results are shown in FIGS. 6-8 below.

Figure 6:
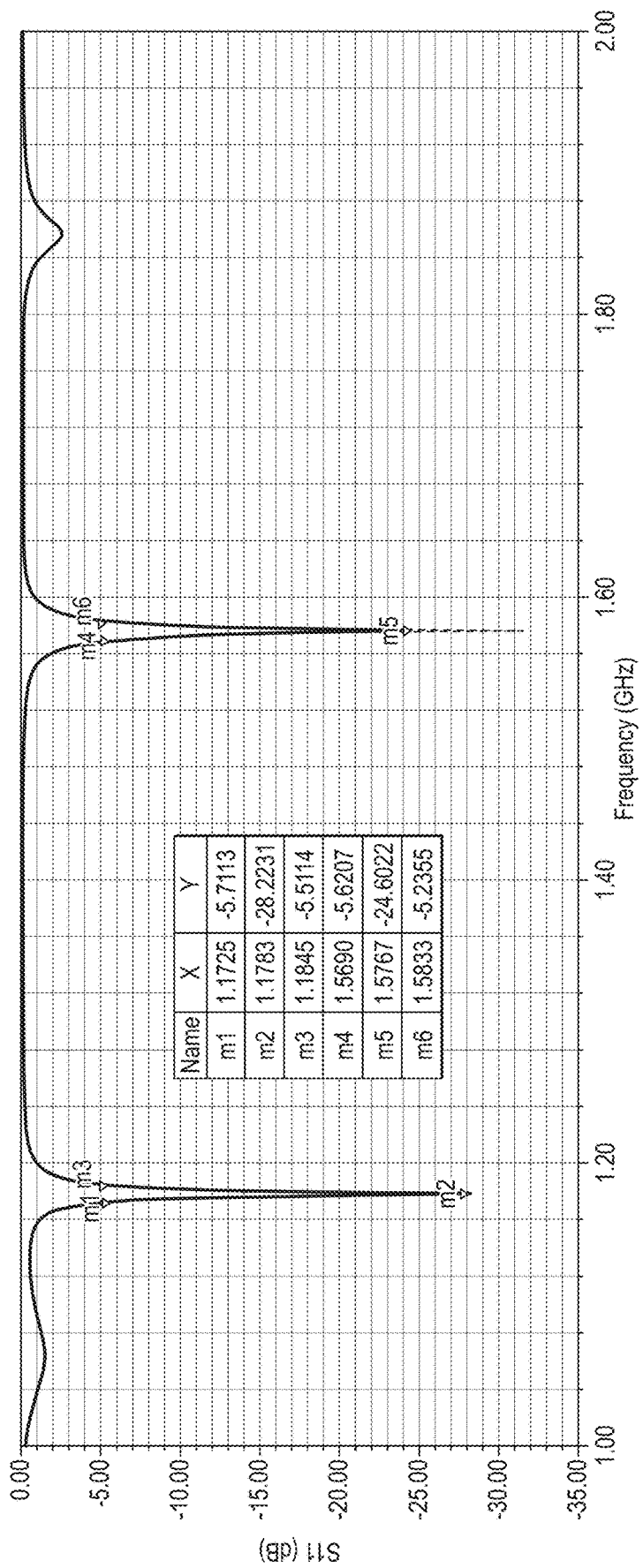
FIG. 6 is a plot illustrating a simulated reflection coefficient of an antenna as a function of frequency, consistent with some embodiments of the present disclosure.

FIG. 6 is a plot illustrating a simulated reflection coefficient (S11) of an antenna as a function of frequency, consistent with some embodiments of the present disclosure. The parameters of the antenna are shown in the third column of Table 520 of FIG. 5. A reflection coefficient or return loss represents how much power is reflected from the antenna. For example, if S11=0 dB, then all the power is reflected from the antenna and no power is radiated. FIG. 6 also shows x-coordinates (frequencies) and y-coordinates (S11)

of six points m1-m6 on the plot. As shown in FIG. 6, S11 shows peaks at 1.1783 GHz and 1.5767 GHz, indicating a good match with the L5 frequency band and L1 frequency band, respectively.

Figure 7A:
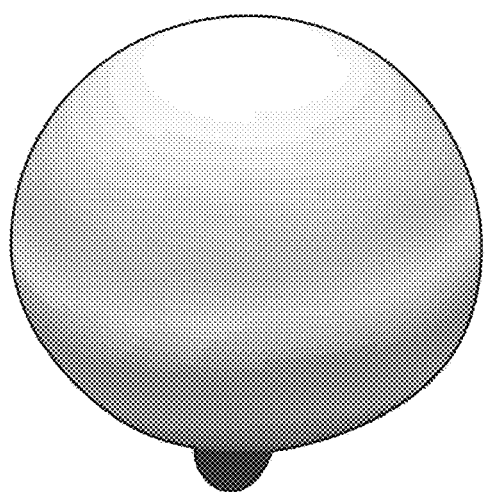
FIG. 7A is a plot illustrating a simulated radiation pattern of an antenna at an L1 frequency.
Figure 7A:
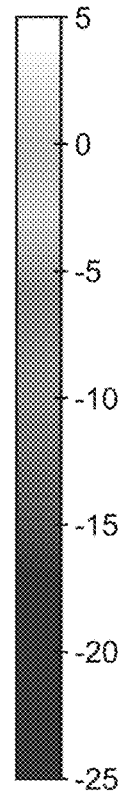
Figure 7B:
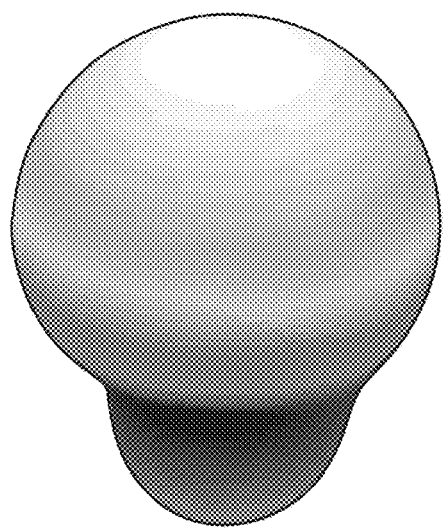
FIG. 7B is a plot illustrating a simulated radiation pattern of the antenna at an L5 frequency, consistent with some embodiments of the present disclosure.
Figure 7B:
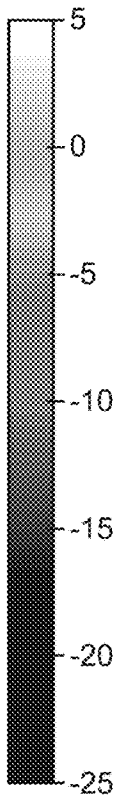
Figure 8:
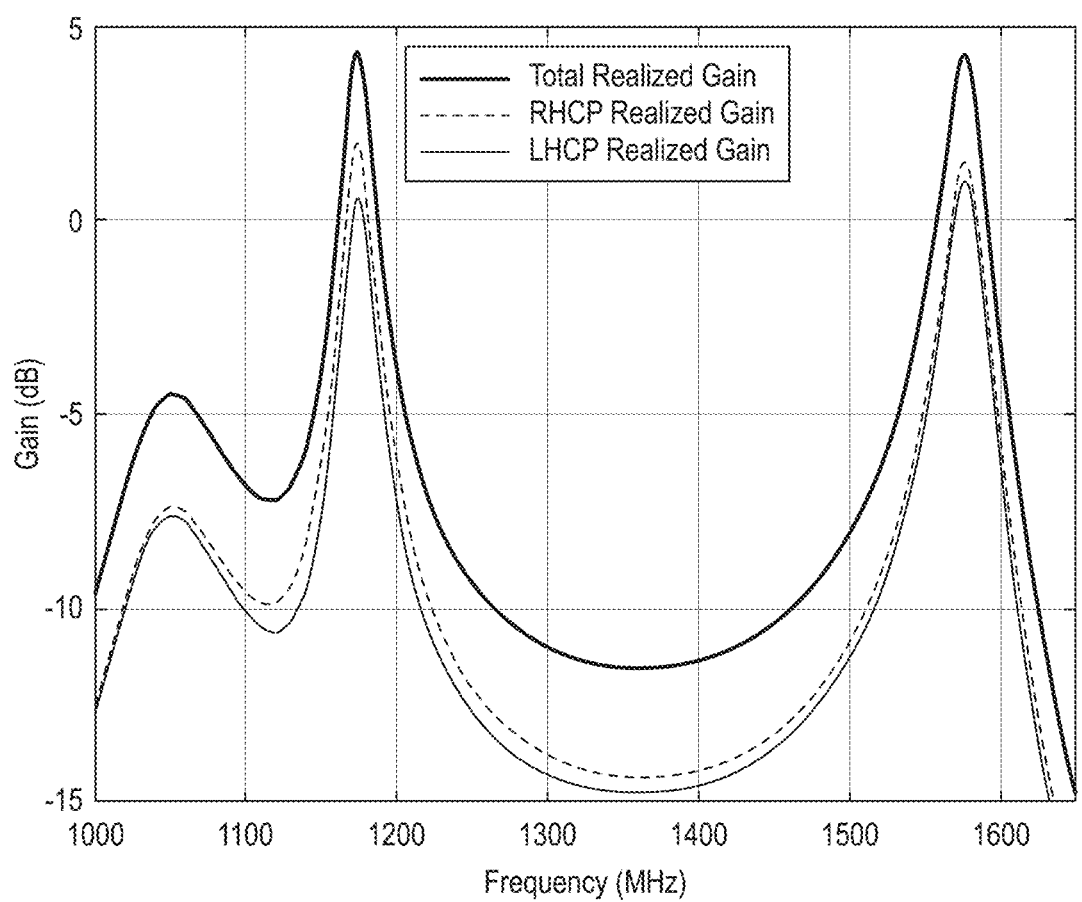
FIG. 8 is a plot illustrating simulated gains towards a zenith of an antenna as a function of frequency, consistent with some embodiments of the present disclosure.

FIG. 7A is a plot illustrating a simulated radiation pattern of an antenna at an L1 frequency, and FIG. 7B is a plot illustrating a simulated radiation pattern of the antenna at an L5 frequency, consistent with some embodiments of the present disclosure. The parameters of the antenna are shown in the third column of Table 520 of FIG. 5. FIGS. 7A and 7B show that the total realized gain has a maximum toward the zenith direction (upward or sky-facing direction).

FIG. 8 is a plot illustrating simulated realized gains towards a zenith direction of an antenna as a function of frequency, consistent with some embodiments of the present disclosure. FIG. 8 shows three different realized gains: a realized gain for left hand circularly polarized (LHCP) signals, a realized gain for right hand circularly polarized (RHCP) signals, and a total realized gain (combination of the realized gain for the RHCP signals and the realized gain for the RHCP signals). As shown in FIG. 8, the total realized gain has a maximum gain of above 4 dB at both central frequencies (L1 and L5), and the realized gain for the RHCP signals is greater than the realized gain for the LHCP signals.

Figure 9:
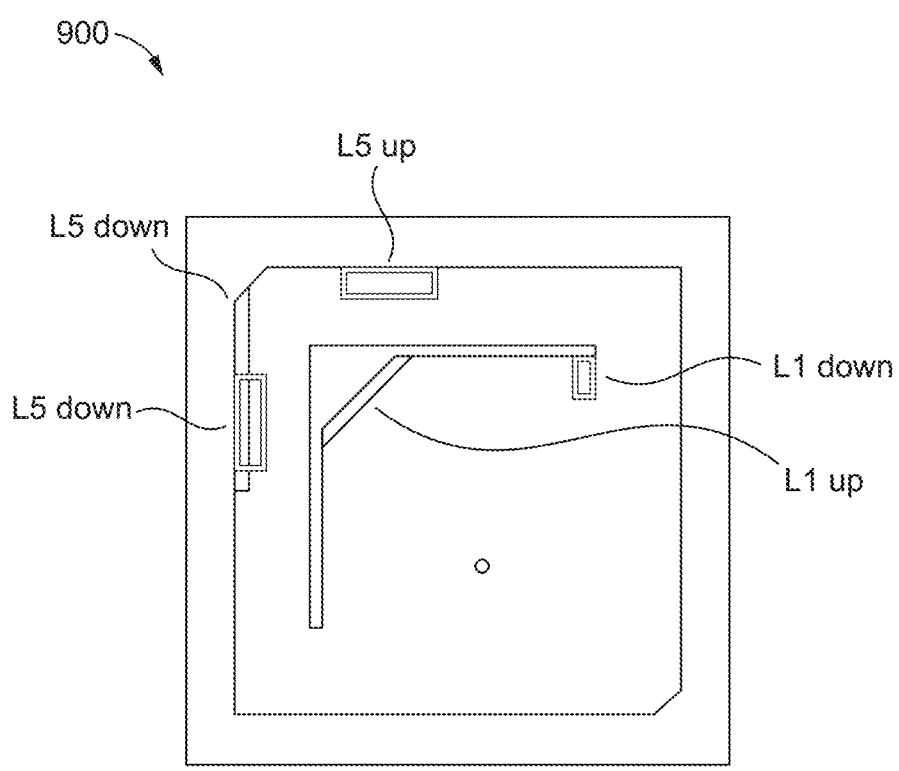
FIG. 9 is a schematic diagram illustrating positions for tuning an antenna, consistent with some embodiments of the present disclosure.

FIG. 9 is a schematic diagram illustrating tuning an antenna 900, consistent with some embodiments of the present disclosure. In an embodiment, antenna 900 has the same structure as antenna 100 in FIG. 1B, and thus, the reference numbers for the elements of antenna 900 are the same as that of antenna 100. For brevity, the reference numbers for the elements of antenna 900 are omitted. In an embodiment, an end-of-line tuning of the antenna element may be performed by removing a portion of conductive layer 104 at an appropriate position to shift up or down the resonant frequencies. FIG. 9 shows determined appropriate positions at which the two resonant frequencies L1 and L5 can be tuned independently. For example, if the resonant frequency at L5 is too high, a portion of conductive layer 104 in the regions marked as "L5 down" may be removed. Similarly, if the resonant frequency at L1 is too high, a portion of conductive layer 104 in the regions marked as "L1 down" may be removed. The removal of portions of conductive layer 104 may be done by a method known in the art (e.g., etching, polishing, etc.), until the resonant frequencies match the desired resonant frequencies. Similarly, if the resonant frequency at L1 or L5 is too low, portions of conductive layer 104 in the regions marked as "L1 up" or "L5 up" may be removed.

Figure 10:
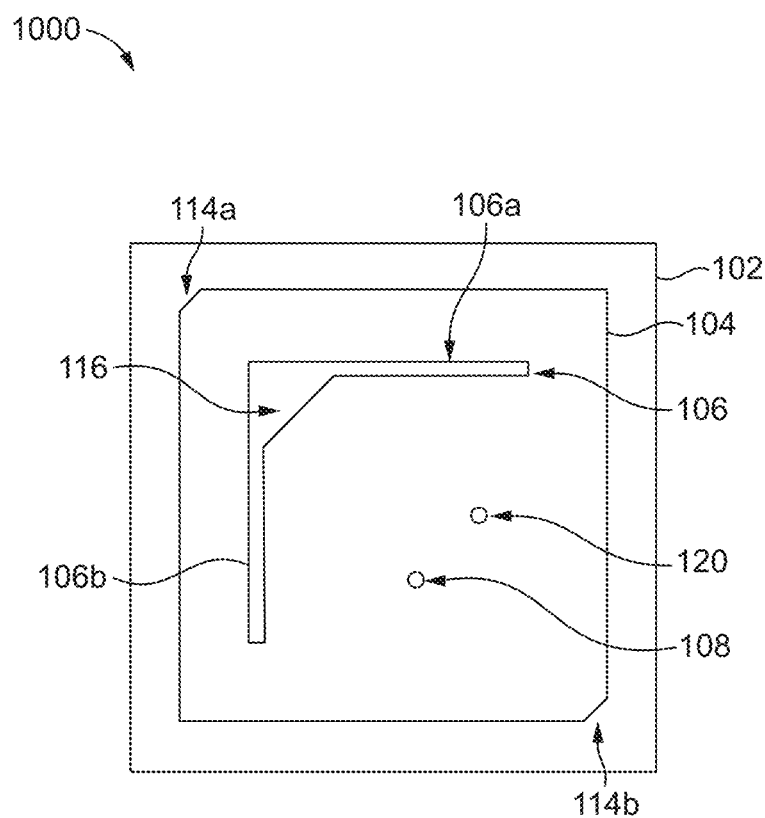
FIG. 10 is a schematic diagram illustrating a front view of an antenna having two feed points, consistent with some embodiments of the present disclosure.

FIG. 10 is a schematic diagram illustrating a front view of an antenna 1000 having two feed points, consistent with some embodiments of the present disclosure. In an embodiment, antenna 1000 has the same structure as antenna 100 in FIG. 1B, and thus, the reference numbers for the elements of antenna 1000 are the same as that of antenna 100. Antenna 1000 implements a dual-feed points to excite two orthogonal modes at each frequency. For example, as shown in FIG. 10, antenna 1000 includes a first feed point 108 that generates a first polarized signal; and a second feed point 120 that generates a second polarized signal, the first polarized signal and the second polarized signal being orthogonal.

Figure 11:
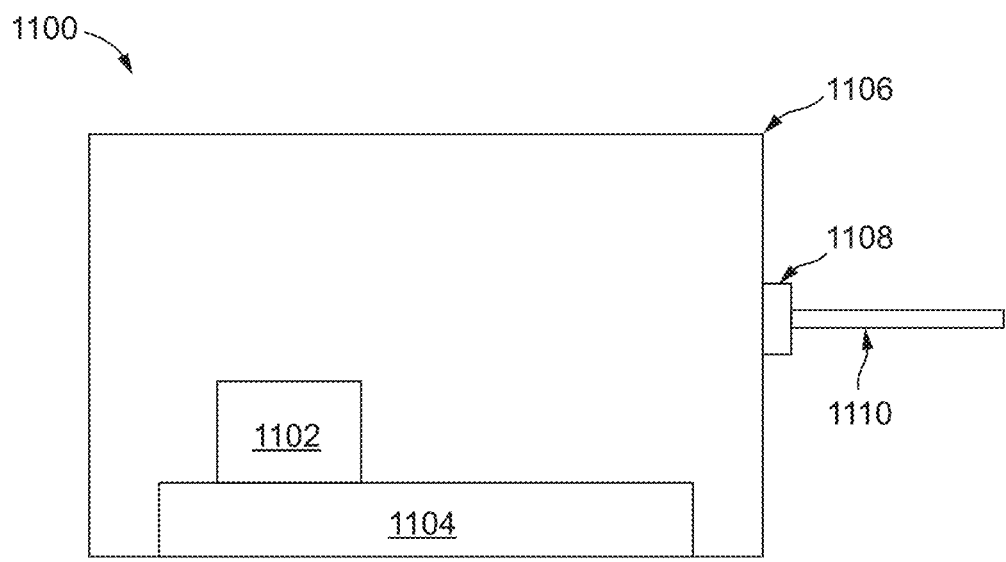
FIG. 11 is a schematic diagram illustrating a cross sectional view of an antenna module, consistent with some embodiments of the present disclosure.

FIG. 11 is a schematic diagram illustrating a cross sectional view of an antenna module 1100, consistent with some embodiments of the present disclosure. Referring to FIG. 11, antenna module 1100 includes an antenna 1102 attached to a printed circuit board (PCB) 1104. Antenna 1102 may have the same structure as antenna 100 in FIG. 1B or the same structure as antenna 1000 in FIG. 10. A housing 1106 encloses antenna 1102 and PCB 1104. Other components (not shown), for example, a dual-band bandpass filter and amplifier (or variations thereof, e.g., a diplexer, two single-band bandpass filters, two amplifiers and a combiner) may also be attached to PCB 1104. Antenna module 1100 includes an output 1108 which is connected to a coaxial cable 1110. Coaxial cable 1110 connects antenna module 1100 to a receiver or other devices.

Figure 12:
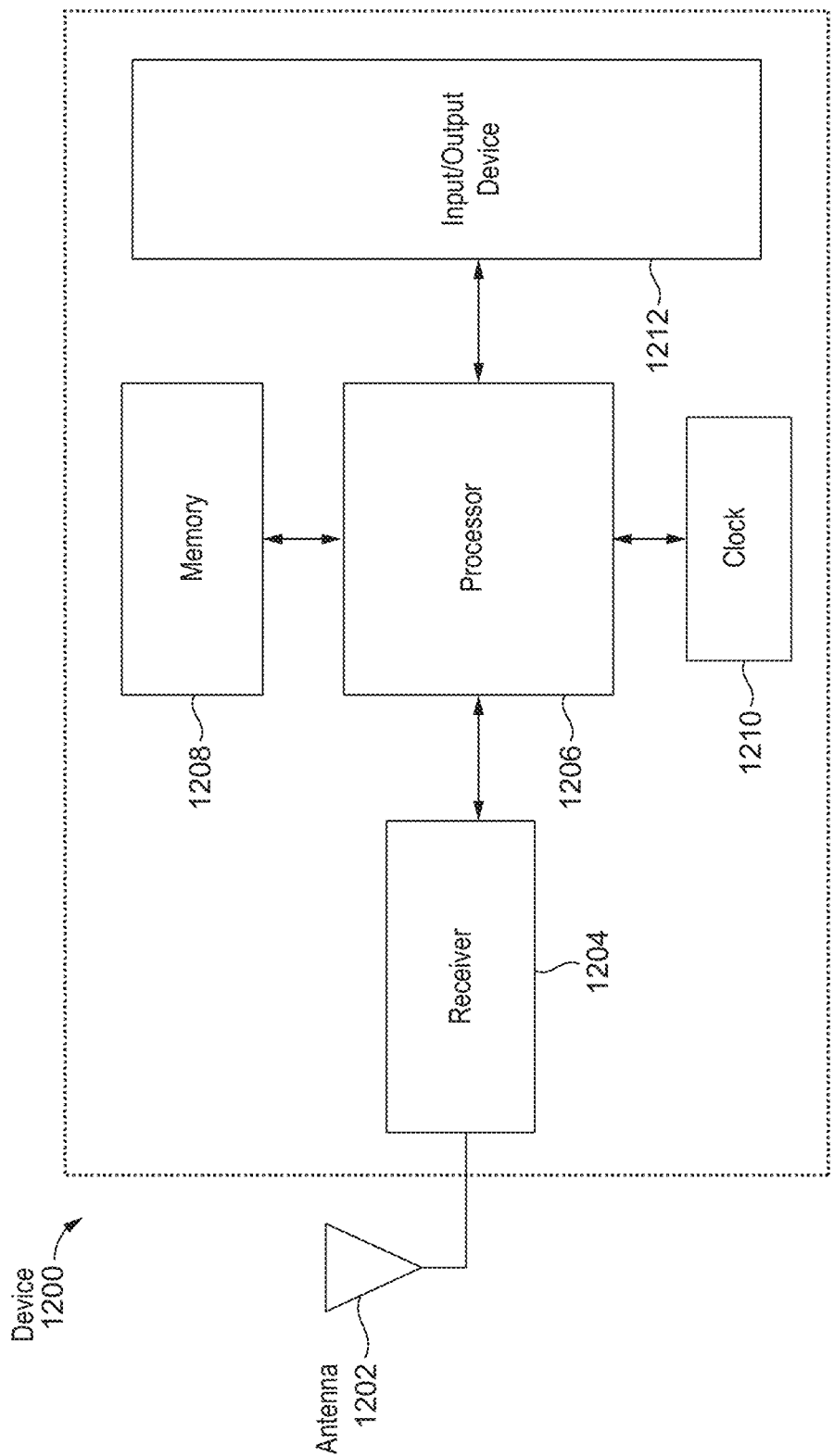
FIG. 12 is a block diagram of a device, consistent with some embodiments of the present disclosure

FIG. 12 is a block diagram of an exemplary device 1200, consistent with some embodiments of the present disclosure. Referring to FIG. 12, device 1200 may take any form, including but not limited to, a laptop computer, a Global Positioning System (GPS), a wireless terminal including a mobile phone, a wireless handheld device, a wireless personal device, or any other forms. Device 1200 includes an antenna 1202, a receiver 1204 coupled to antenna 1202, a processor 1206, a memory 1208, a local clock 1210, and an input/output device 1212.

Antenna 1202 may be a compact patch antenna, such as antenna 100 of FIG. 1B or antenna 1000 of FIG. 10, that operates at dual resonant frequencies (e.g., L1 and L5 frequencies) with a slot formed in a patch layer. Antenna 1202 may further provide right hand circular polarization by forming chamfers at the patch layer and adjusting the orientation of the slot. By selecting a position, size, and shape of the slot and a position of a feed point, the antenna may be operated in non-dominant modes. In an exemplary embodiment, a form factor of the antenna may be 24×24×5 mm$^3$ so that the antenna fits in a standard GNSS L1 antenna housing.

Receiver 1204, coupled to antenna 1202, is configured to receive a signal from one or more signal sources. In some embodiments, receiver 1204 may be part of a transceiver modem which includes a transmitter configured to transmit data to an external device. Local clock 1210 provides a time of a local place at which device 1200 is disposed.

Processor 1206 may include one or more dedicated processing units, application-specific integrated circuits (ASICs), field-programmable gate arrays (FPGAs), or various other types of processors or processing units. In an embodiment, receiver 1204 may be a front-end processor that performs signal processing in receiver 1204, and processor 1206 may be a back-end processor that receives the signal processing results from receiver 1204 and provides feedback to receiver 1204. Processor 1206 may also perform a portion of the signal processing of receiver 1204. Processor 1206 may perform additional computation, for example, for determining a position of the receiver. Processor 1206 may be further configured to control the performance of input/output device 1212, clock 1210, and memory 1208.

Memory 1208 may be any type of computer-readable storage medium including volatile or non-volatile memory devices, or a combination thereof. Memory 1208 may store information related to identities of device 1200 and GNSS signals received by receiver 1004. Memory 1208 may also store post processing signals. Memory 1208 may also store computer-readable program instructions and mathematical models that are used in signal processing in receiver 1204 and computations performed in processor 1206. Memory 1208 may further store computer-readable program instructions for execution by processor 1206 to operate device 1200.

Input/output device 1212 may be used to communicate a result of signal processing to a user or another device. Input/output device 1212 may include a user interface including a display and an input device to transmit a user command to processor 1206. The display may be configured to display a status of signal reception at device 1200, the data stored in memory 1208, a status of signal processing, and a result of the signal processing, etc. The display may include, but is not limited to, a cathode ray tube (CRT), a liquid crystal display (LCD), a light-emitting diode (LED), a gas plasma display, a touch screen, or other image projection devices for displaying information to a user. Input/output device 1212 may include a keyboard, a mouse, a scanner, a digital camera, a joystick, a trackball, cursor direction keys, a touchscreen monitor, or audio/video commanders, etc. Input/output device 1212 may further include a machine interface, such as an electrical bus connection or a wireless communications link.

The computer-readable storage medium of the present disclosure, e.g., included in memory 1208, may be a tangible device that can store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing.

The computer-readable program instructions of the present disclosure may be assembler instructions, instruction-set-architecture (ISA) instructions, machine instructions, machine-dependent instructions, microcode, firmware instructions, state-setting data, or source code or object code written in any combination of one or more programming languages, including an object-oriented programming language, and conventional procedural programming languages. The computer-readable program instructions may execute entirely on a computing device, e.g., processor 1206, as a stand-alone software package, or partly on a first computing device and partly on a second computing device remote from the first computing device. In the latter scenario, the second, remote computing device may be connected to the first computing device through any type of network, including a local area network (LAN) or a wide area network (WAN).

The flowcharts and block diagrams in the figures illustrate examples of the architecture, functionality, and operation of possible implementations of systems, methods, and devices according to various embodiments. It should be noted that, in some alternative implementations, the functions noted in blocks may occur out of the order noted in the figures. For example, two blocks shown in succession may, in fact, be executed substantially concurrently, or the blocks may sometimes be executed in the reverse order, depending upon the functionality involved.

It is understood that the described embodiments are not mutually exclusive, and elements, components, materials, or steps described in connection with one example embodiment may be combined with, or eliminated from, other embodiments in suitable ways to accomplish desired design objectives.

Reference herein to "some embodiments" or "some exemplary embodiments" means that a particular feature, structure, or characteristic described in connection with the embodiment can be included in at least one embodiment. The appearance of the phrases "one embodiment" "some embodiments" or "another embodiment" in various places in the present disclosure do not all necessarily refer to the same embodiment, nor are separate or alternative embodiments necessarily mutually exclusive of other embodiments.

As used in the present disclosure, the word "exemplary" is used herein to mean serving as an example, instance, or illustration. Any aspect or design described herein as "exemplary" is not necessarily to be construed as preferred or advantageous over other aspects or designs. Rather, use of the word is intended to present concepts in a concrete fashion.

As used in the present disclosure, unless specifically stated otherwise, the term "or" encompasses all possible combinations, except where infeasible. For example, if it is stated that a database may include A or B, then, unless specifically stated otherwise or infeasible, the database may include A, or B, or A and B. As a second example, if it is stated that a database may include A, B, or C, then, unless specifically stated otherwise or infeasible, the database may include A, or B, or C, or A and B, or A and C, or B and C, or A and B and C.

Additionally, the articles "a" and "an" as used in the present disclosure and the appended claims should generally be construed to mean "one or more" unless specified otherwise or clear from context to be directed to a singular form.

Unless explicitly stated otherwise, each numerical value and range should be interpreted as being approximate as if the word "about" or "approximately" preceded the value of the value or range.

Although the elements in the following method claims, if any, are recited in a particular sequence, unless the claim recitations otherwise imply a particular sequence for implementing some or all of those elements, those elements are not necessarily intended to be limited to being implemented in that particular sequence.

It is appreciated that certain features of the present disclosure, which are, for clarity, described in the context of separate embodiments, may also be provided in combination in a single embodiment. Conversely, various features of the specification, which are, for brevity, described in the context of a single embodiment, may also be provided separately or in any suitable sub-combination or as suitable in any other described embodiment of the specification. Certain features described in the context of various embodiments are not essential features of those embodiments, unless noted as such.

It will be further understood that various modifications, alternatives and variations in the details, materials, and arrangements of the parts which have been described and illustrated in order to explain the nature of described embodiments may be made by those skilled in the art without departing from the scope. Accordingly, the following claims embrace all such alternatives, modifications and variations that fall within the terms of the claims.

What is claimed is:
1. An antenna, comprising:
a substrate layer having a first surface and an opposite second surface, the second surface having a metallization layer;
a conductive layer disposed on the first surface of the substrate layer;

a slot formed in the conductive layer, the slot comprising a first part and a second part that are symmetric to each other about a diagonal of the conductive layer; and at least one feed point on the conductive layer and spaced from the slot by a predetermined distance, wherein the at least one feed point is positioned off horizontal, vertical, and diagonal center lines of the conductive layer, and wherein at least one portion of the conductive layer is selectively removed to tune at least one of two resonant frequencies provided by the antenna.

2. The antenna of claim 1, where the first part and the second part of the slot have substantially rectangular shapes to form a first rectangle and a second rectangle.

3. The antenna of claim 2, wherein:

the first and second rectangles are substantially perpendicular to each other and connected to each other at a corner, and a portion of the conductive layer at the corner is cut to form a slot chamfer.

4. The antenna of claim 3, wherein two outer corners of the conductive layer are cut to form patch chamfers.

5. The antenna of claim 4, wherein the patch chamfers and the slot chamfer are disposed in parallel direction.

6. The antenna of claim 5, wherein an orientation of the slot is selected such that the antenna provides right-hand circular polarization.

7. The antenna of claim 1, wherein the substrate layer is made of a dielectric material having a dielectric constant in a range of 15-60.

8. The antenna of claim 7, wherein the dielectric constant of the substrate layer is substantially equal to 37.

9. The antenna of claim 1, wherein the shape, the length, and the position of the slot, and the position of the at least one feed point are selected such that the antenna is operated in non-dominant modes.

10. The apparatus of claim 1, wherein the at least one feed point comprises two feed points that provide two orthogonal modes at each frequency at which the antenna is operated.

11. The apparatus of claim 1, wherein the first surface of the substrate layer has a square shape with a length in a range of 15-30 mm, and a thickness of the substrate layer is in a range of 2-8 mm.

12. The antenna of claim 1, wherein a shape, a length, and a position of the slot and a position of the at least one feed point are selected such that the antenna provides dual resonance having the two resonant frequencies defined by the selected shape, length, and position of the slot and the position of the at least one feed point.

13. The antenna of claim 1, wherein the tuning is an end-of-line tuning.

14. The antenna of claim 1, wherein the two resonant frequencies are tuned independently.

15. A device, comprising:

a housing;

a printed circuit board; and an antenna attached to the printed circuit board and disposed inside the housing, wherein the antenna comprises:

a substrate layer having a first surface and an opposite second surface, the second surface having a metallization layer;

a conductive layer disposed on the first surface of the substrate layer;

a slot formed in the conductive layer, the slot comprising a first part and a second part that are symmetric to each other about a diagonal of the conductive layer; and at least one feed point on the conductive layer and spaced from the slot by a predetermined distance, wherein the at least one feed point is positioned off horizontal, vertical, and diagonal center lines of the conductive layer, and wherein at least one portion of the conductive layer is selectively removed to tune at least one of two resonant frequencies provided by the antenna.

16. The device of claim 15, further comprising:

an output connected to a coaxial cable that connects the device to another device.

17. The device of claim 15, further comprising:

at least one of a bandpass filter, an amplifier, a diplexer, or a combiner configured to process a signal received by the antenna.

18. An apparatus, comprising:

a patch antenna configured to provide dual resonant frequencies, including a slot formed in a conductive layer of the antenna; and a receiver configured to process signals received from the antenna and provide positioning information, wherein the at least one feed point is positioned off horizontal, vertical, and diagonal center lines of the conductive layer, and wherein at least one portion of the conductive layer is selectively removed to tune at least one of the dual resonant frequencies.

19. The apparatus of claim 18, wherein:

the patch antenna further comprises a slot chamfer formed at a corner of the slot and a pair of patch chamfers formed at two outer corners of the conductive layer.

* * * * *